United States Patent [19]
Barone

[11] Patent Number: 5,503,022
[45] Date of Patent: Apr. 2, 1996

[54] MARINE IMPELLER TESTER

[76] Inventor: Larry A. Barone, P.O. Box 344, Goodyear, Ariz. 85338

[21] Appl. No.: 341,675

[22] Filed: Nov. 17, 1994

Related U.S. Application Data

[63] Continuation-in-part of Ser. No. 253,972, Jun. 3, 1994, Pat. No. 5,445,012, which is a continuation of Ser. No. 8,474, Jan. 25, 1993, abandoned.

[51] Int. Cl.$^6$ .................................................. G08B 21/00
[52] U.S. Cl. .................................................. 73/714; 440/2
[58] Field of Search ........................... 73/4 R, 4 V, 115, 73/116, 117.1, 714, 740; 116/26, 264–266, 271, 291, 300; 440/2

[56] References Cited

U.S. PATENT DOCUMENTS

| | | | |
|---|---|---|---|
| 3,057,977 | 10/1962 | Caswell | 340/611 |
| 3,864,260 | 2/1975 | Banner . | |
| 4,630,036 | 12/1986 | Ford | 340/984 |
| 4,872,857 | 10/1989 | Newman et al. . | |
| 5,197,909 | 3/1993 | Rossitto | 440/2 |

*Primary Examiner*—Robert Raevis
*Attorney, Agent, or Firm*—H. Gordon Shields

[57] ABSTRACT

A marine engine is provided with an outdrive unit which incorporates a water impeller to supply water to the marine engine in order to maintain proper engine cooling.

Devices are currently available that allow the watercraft's engine to be started when the craft is not in actual service. These devices attach to the crafts outdrive unit and they provide for water, from a household faucet, to be supplied to the water impeller. These devices have no form of measurement to communicate to the operator that a sufficient amount of water is initially being supplied to the water impeller to prevent damage to that component nor do they communicate if the water impeller is capable of producing sufficient suction to feed the crafts engine with sufficient coolant so that the engine will not over-heat when the craft is placed in its operating environment. Wherein, the invention consists of an impeller tester which is placed in existing outdrive water supply devices, or is permanently installed in the water craft. Wherein, the invention will communicate to the operator that a sufficient supply of water is available and the water impeller will not be damaged upon starting the crafts engine. Wherein, the invention also communicates to the operator that the water impeller is functioning properly and is producing sufficient pressure to supply the marine engine with sufficient coolant so it will perform without over-heating when the outdrive unit is not supplied with a pressurized water supply.

8 Claims, 2 Drawing Sheets

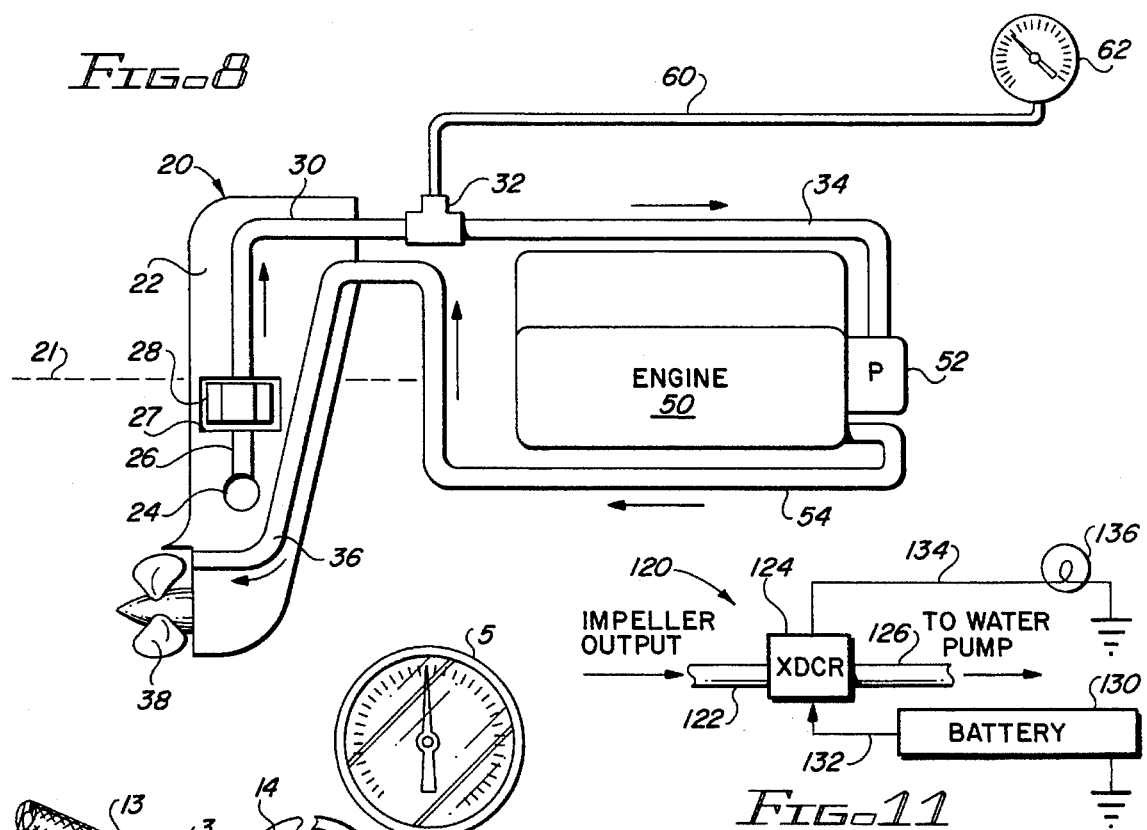
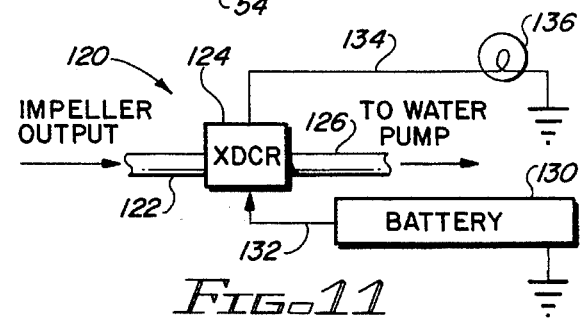
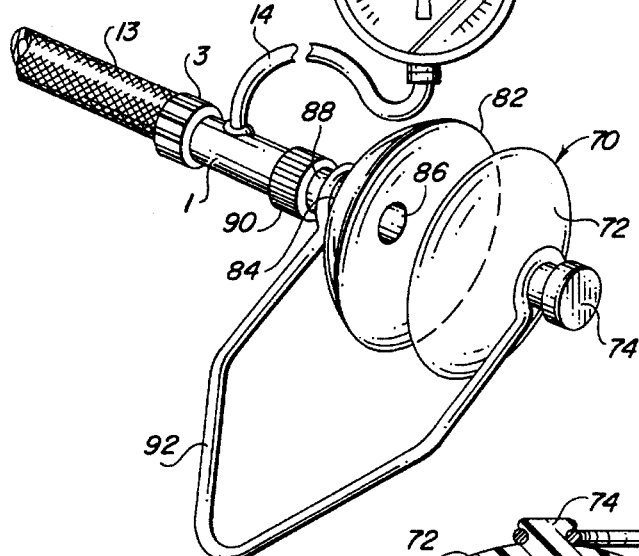
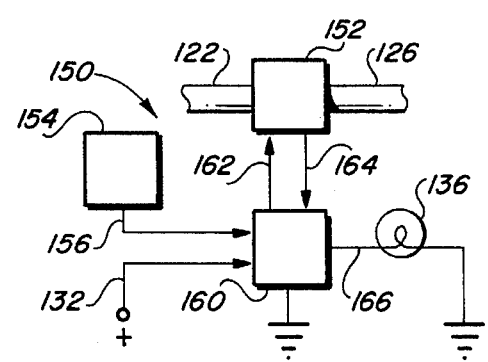
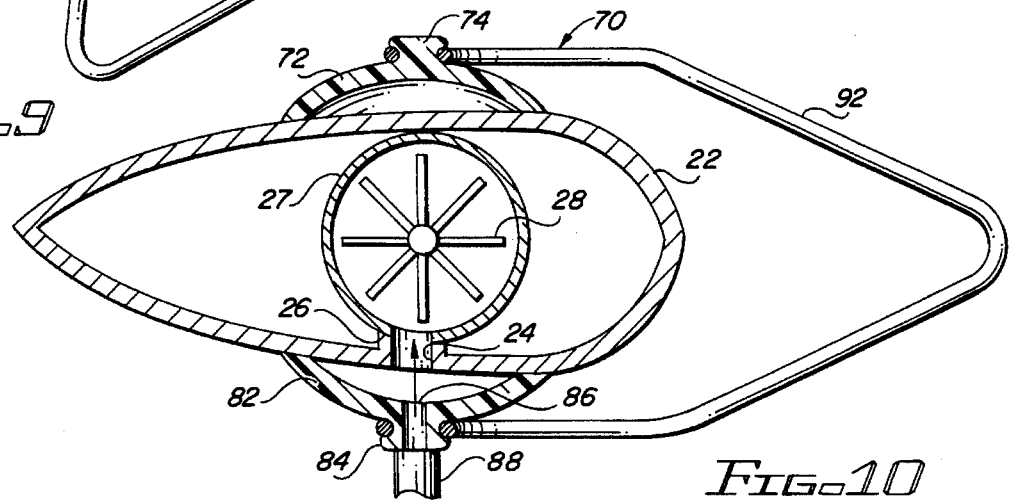

MARINE IMPELLER TESTER

This application is a Continuation In Part application of Ser. No. 08/253,972, filed Jun. 3, 1994, U.S. Pat. No. 5,445,012, which is a Continuation application of Ser. No. 08/008,474, filed Jan. 25, 1993 (now abandoned).

BACKGROUND OF THE INVENTION

CROSS REFERENCE TO RELATED APPLICATION

1. Field of the Invention

The field of the invention relates to engines for boats, and more particularly, to a new and improved method of determining if the water impeller, which is located in the outdrive unit, of a marine engine, and which pumps coolant water to the engine from the body of water on which the boat is disposed, is functioning correctly.

The impeller tester provides for the measurement of the inlet and outlet water pressures. These pressures are measured and transmitted through a calibrated gauge or calibrated transducers and lamp modification to indicate to the operator if the water impeller has adequate water supply and if the water impeller is functioning properly.

2. Description of the Prior Art

While various devices and components have been utilized in the prior art in allowing the marine engine to be started and run out of water, they have not communicated if the water impeller in the stern drive or outdrive unit is functioning properly.

Prior state of the art devices are only designed to supply water to the marine engines outdrive unit. These devices allow for a method to attach a standard garden hose from a faucet to the outdrive unit. The amount of water supplied from the faucet is not monitored by these devices and only allows that water be supplied to the marine engine by the water pressure which is available within the municipal water system. A fault of these water supply systems is that they do not indicate if sufficient water pressure is being supplied to safely run the engine, without damaging the water impeller, nor can they determine if the water impeller which is located in the outdrive unit is functioning and capable of pumping non-pressurized water to the marine engine. These devices thereby will allow the engine to function correctly and not over heat when tested out of the water even though the water impeller in the outdrive unit has failed and is no longer capable of pumping ambient water (unpressurized) to the marine engine when the watercraft is put in actual service.

As such, it may be appreciated that there continues to be a need for a new and improved method to monitor water pressures both while supplying water to a marine engine when being tested out of water and while the craft is in actual service.

The testing of the watercraft's marine engine is done out of water in order to determine if the marine engine is operating properly prior to taking it to an area intended for watercraft use.

Prior state of the art devices allow water to be supplied to the marine engine but do not communicate if the outdrive components are functioning properly. This is due to the water being supplied under pressure. Wherein, water under pressure will supply the engine with sufficient coolant so that it appears to be functioning properly even though the water impeller has failed and will not supply water to the marine engine when the watercraft is put in actual use.

U.S. Pat. No. 2,100,754 (Seegers) discloses a pressure gauge which includes a dual gauge, with one portion of the dial graduated for vacuum pressure and a second portion for positive pressure readings. The dial is adjustable to provide a desired zero reference.

U.S. Pat. No. 2,227,514 (Seegers) discloses another type of pressure gauge in which the dial is also calibrated for vacuum pressure and for positive pressure. The dial is adjustable to provide a desired zero reference.

U.S. Pat. No. 2,247,102 (Sugdenet al) discloses a pressure gauge having an adjustable dial.

U.S. Pat. No. 3,969,931 (Lanning) discloses tester apparatus for testing the hydraulic capabilities of an outboard drive assembly.

Italian patent 277,473 (Drager) discloses the coupling of a gauge to a fluid line.

Italian patent 546,083 (Malakoff) discloses the use of a pressure gauge between threaded ends for insertion into a fluid line.

SUMMARY OF THE INVENTION

In view of the foregoing disadvantages inherent in the known methods of supplying water to a marine engine while being tested out of water, the instant invention provides an impeller tester which communicates to the operator that there is sufficient inlet water pressure available and correct outlet vacuum induced by the water impeller when the engine is tested out of water. This is necessary if an individual is to insure that the marine engine will be supplied with sufficient coolant when the water impeller is not being supplied with pressurized coolant from a household faucet. As such, the general purpose of the instant invention, which will be described subsequently in greater detail, is to provide a new and improved method of supplying pressurized coolant to a marine engine which has all the advantages of prior art and none of the disadvantages.

The marine engine is equipped with an outdrive unit. This outdrive unit not only incorporates the means to propel the craft by the rotation of the propeller, but also incorporates a water impeller which provides the means to pump water to the marine engines cooling components while the craft is in service.

Prior art devices are designed to supply water to the outdrive unit in order that the marine engine can be test run when the craft is out of the water prior to taking the craft to the desired recreation area, but do not incorporate any method of monitoring whether correct initial water pressure is present or whether the water impeller is functioning correctly.

One embodiment of the present invention comprises a cylinder housing which has a female thread at one end to allow a standard garden hose to be attached to the cylinder. On the other end of the cylinder is a male thread which allows the cylinder to be attached to existing devices used in supplying pressurized water to the outdrive unit. The invention also incorporates a nipple in its center to provide for the attachment of a calibrated gauge.

The gauge has two calibrated scales which are separated by a zero position between them. On one side of the zero position the gauge is calibrated to read water pressure in PSI, and on the other side of the zero position the gauge is calibrated to read Inches of Vacuum. The pressure side of the gauge measures the water pressure supplied to the outdrive unit from the garden hose or other source of input water. The gauge is scaled so the operator can adjust the inlet water pressure to a specific value and insure that a sufficient amount of water is being supplied so that the water impeller is not damaged when the marine engine is started. The gauge is rotatable to allow the scale to be rotated to the zero position prior to starting the engine. Upon starting the marine engine, the second scale of the gauge will communicate to the operator of the apparatus that the water impeller is providing adequate suction (Inches of Vacuum) to supply the engine with coolant water.

The gauge is calibrated in two modes to insure that the operator can visually determine by the calibrations on the gauge that sufficient water is initially being supplied and that the water impeller is providing sufficient suction to supply proper coolant to the engine when the craft is put in actual operation and the water impeller is not being supplied by a pressurized water source.

Additional forms of the present invention include the integration of the means to supply the pressurized water to the outdrive unit in conjunction with the impeller tester being an integral part of the water supplying device. Also, a form of the invention can be installed permanently in the watercraft and display to the operator that the water impeller is providing an adequate water supply to the engine while the craft is in actual use.

It is an object of the instant invention to provide a new and useful impeller tester which has all the advantages of the prior art and none of the disadvantages.

It is another object of the instant invention to provide a new impeller tester which may be easily and efficiently manufactured and marketed.

It is a further object of the instant invention to provide a new impeller tester which is of a durable and reliable construction.

It is another object of the present invention to provide new and useful apparatus for testing the impeller of a marine outdrive unit.

It is another object of the present invention to provide new and useful apparatus for continually monitoring the output of an impeller in an marine outdrive unit.

BRIEF DESCRIPTION OF THE DRAWING

FIG. 8 is a side view schematically illustrating an alternate embodiment of the apparatus of the present invention.

FIG. 9 is a perspective view illustrating the operation of the elements involved with the apparatus of FIGS. 1–5.

FIG. 10 is a view in partial section illustrating the operation of the apparatus of FIG. 7 related to the environment of a portion of the apparatus of FIG. 8.

FIG. 11 is a schematic circuit diagram illustrating the operation of the apparatus of FIG. 8.

FIG. 12 is a schematic diagram of another alternate embodiment of the apparatus of the present invention.

DESCRIPTION OF THE PREFERRED EMBODIMENT

Figure 1:
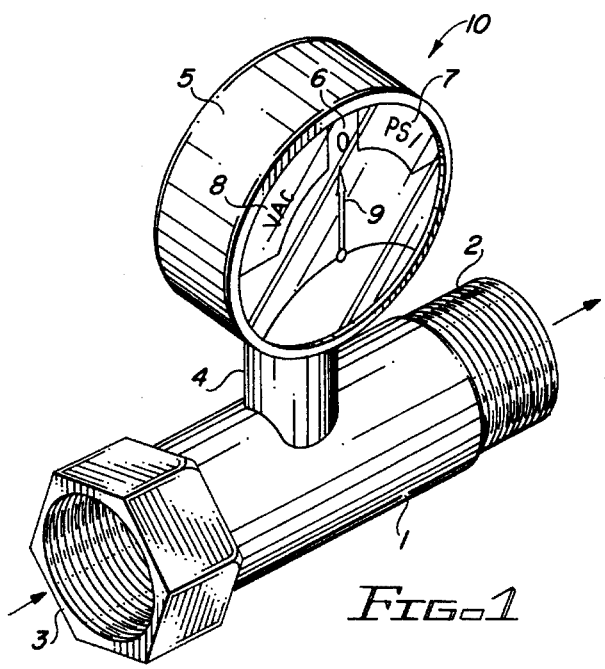
FIG. 1 is a perspective view of the apparatus of the present invention.

FIG. 1 is an isometric projection of an impeller tester apparatus 10 in accordance with the present invention. The apparatus 10 includes a cylinder 1 through which water flows in the direction indicated by the arrows. A calibrated gauge 5 is secured to the cylinder 1 to indicate the relative pressure of the water flowing through the cylinder 1.

Figure 2:
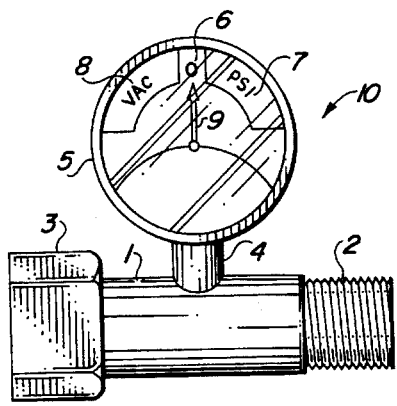
FIG. 2 is a front view of the apparatus of FIG. 1.

FIG. 2 is a front view of the calibrated gauge 5 included in the apparatus 10. The gauge 5 is set in a pre-test position and water is not being supplied to the crafts water impeller in the FIG. 2 condition.

Figure 3:
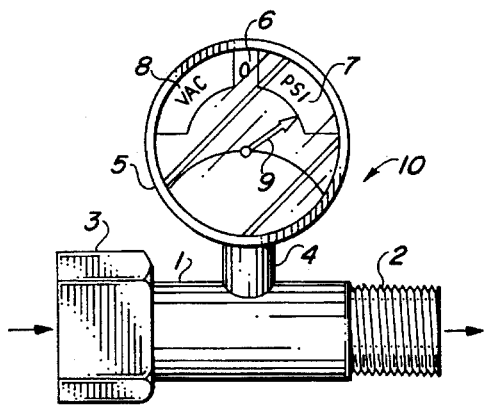
FIG. 3 is a front view of the apparatus of FIG. 2 illustrating the use thereof.

FIG. 3 is a front view of the calibrated gauge 5, with water being supplied to the water impeller tester apparatus 10. The gauge 5 is indicating the water pressure supplied to the water impeller of a craft prior to starting the craft's engine.

Figure 4:
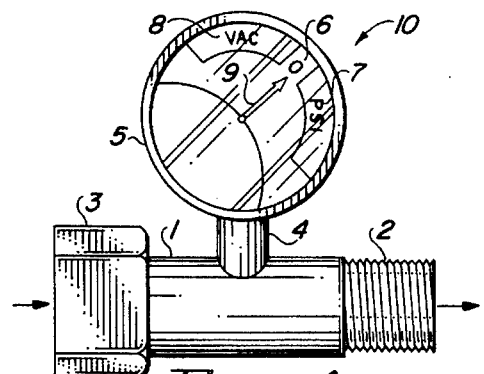
FIG. 4 is a front view of the apparatus of the present invention sequentially following FIG. 3 and illustrating the operation thereof.

FIG. 4 is a front pictorial view of the calibrated gauge 5 sequentially following FIG. 3, with the gauge 5 rotated clockwise to the zero position, effectively cancelling out the pressure of the supplied water for test purposes.

Figure 5:
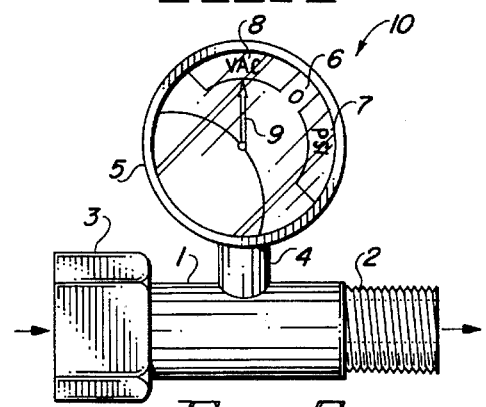
FIG. 5 is a front view of the apparatus of the present invention sequentially following FIG. 4 in illustrating the operation of the apparatus.

FIG. 5 is a front pictorial view of the calibrated gauge 5, sequentially following FIG. 4. The craft's engine is now started and the calibrated gauge 5 is indicating that sufficient vacuum is being produced by the water impeller of the craft to insure that sufficient coolant is supplied to the engine of the craft when the craft is put in actual operation.

Arrows in FIGS. 1, 3, 4, and 5 indicate the direction of water flow.

Figure 7:
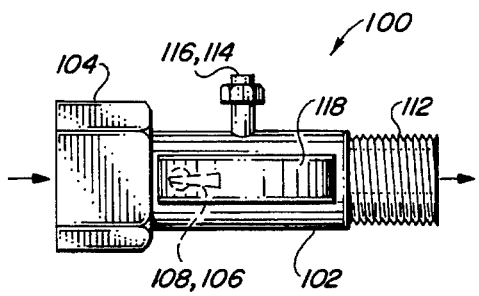
FIG. 7 is a top view of the apparatus of FIG. 6.

The impeller tester apparatus 10 comprises the cylinder member 1, and at one end of the cylinder 1 there is an attachment 3 which allows the impeller tester 10 to be connected to a standard household water faucet or hose bib by a garden hose (See FIG. 7). At the opposite end of the cylinder 1 is a male threaded end 2 which attaches to an existing water supply device, such as shown in FIGS. 7 and 8, currently available for supplying coolant to the outdrive of a boat.

Also attached to the cylinder member 1 is a nipple 4 which allows the calibrated gauge 5 to be attached to the cylinder member 1. The calibrated gauge 5 includes a zero position 6 between a positive pressure scale 7 and a vacuum pressure scale 8. Pressure is indicated by a pointer 9.

The calibrated gauge 5 incorporates the means for the operator to determine the necessary water pressure required for the water impeller by monitoring the reading of the pointer 9 on the positive pressure scale 7 when water is supplied but prior to starting the engine as shown in FIG. 3.

The calibrated gauge 5 is also capable of being rotated to the pre-test zero position 6. After the water impeller is supplied with an adequate water supply, as specified on the scale 7 within the calibrated gauge 5, the gauge is then rotated to the zero position 6, as shown in FIG. 4. At this time the marine engine is then started. The operator can then observe the vacuum scale 8 of the calibrated gauge 5 to determine if sufficient vacuum is being produced by the water impeller to supply the marine engine with proper coolant during its normal operation. This is determined by the operator observing the indication of the pointer 9 within vacuum scale 8, as shown in FIG. 5.

If the pointer 9 is within the appropriate range or scale value within the vacuum scale 8, then the required vacuum is present to insure that the water impeller is operating properly and will supply the marine engine with sufficient coolant to allow for safe operation when the craft in which the engine and the drive unit is disposed is put in its intended use environment.

Figure 6:
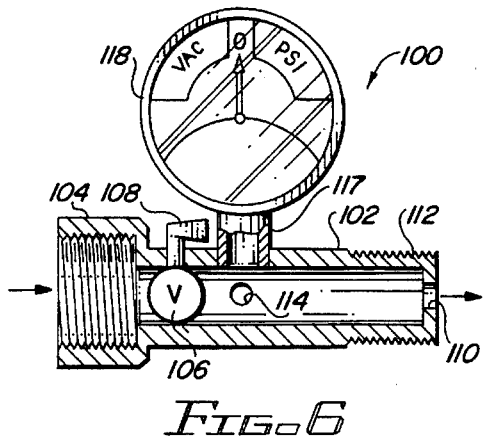
FIG. 6 is a view in partial section schematically illustrating an alternate embodiment of the apparatus of FIGS. 1–5.

FIG. 6 comprises a view in partial section schematically illustrating an alternate embodiment 100 of the apparatus 10 of FIGS. 1–5. FIG. 7 is a top view of the apparatus 100 of FIG. 6. For the following discussion, reference will primarily be made to FIGS. 6 and 7.

The embodiment 100 comprises a cylinder 102 with an input connector 104 on one end and a threaded, output connector 112 at the opposite end of the cylinder 102 from the input connector 104. Large arrows adjacent to FIGS. 6 and 7 illustrate the direction of the flow of the water through the apparatus 100.

Adjacent to the input connector 104, which is substantially identical to the attachment connector 3 of the apparatus 10 of FIGS. 1–5, is a valve 106. The valve 106 includes a valve actuator 108 extending outwardly from the cylinder 102.

At the opposite end of the cylinder 102 from the input connector 104 and the valve 106 is an orifice 110. The orifice 110 extends through a wall at the output end 112 of the cylinder 102.

The purpose of the orifice 110 is to make certain that the apparatus 100 functions properly with low water pressure as input to the apparatus 100.

Extending radially through the cylinder 102 is an air bleed aperture 114. The air bleed aperture 114 extends to an air bleed valve 116. The valve is shown in FIG. 7, while the aperture is shown in FIG. 6.

The purpose of the aperture 114 and the valve 116 is to allow air to be bled from the apparatus 100 when water is initially turned on. That is, when a hose is connected to the input connector 104, and water is turned on, the valve 116 is opened, and remains open until water flows substantially continuously from the valve 116. At that time air has been purged from the apparatus 100 and the valve 116 may then be closed.

Extending upwardly from the cylinder 102 is a nipple or conduit 117. The nipple or conduit 117 extends between the cylinder 102 and a gauge 118. The gauge 118 is substantially identical to the gauge 5 of the apparatus of FIGS. 1–5. The gauge 118 accordingly includes provision for zeroing the pointer after the initial water pressure stabilizes and before the engine to which the apparatus is connected begins to run. This is all as discussed above.

The purpose of the valve 106 and its actuator 108 is to enable an operator or user of the apparatus 100 to provide a desired initial pressure for the apparatus. In essence, the valve 106 and its actuator 108 works in conjunction with the orifice 110. It is preferable to have an initial desired pressure of 8 to 12 PSI from the input water connection 104 through the apparatus 100 and on to the tester apparatus, as will be discussed in detail below. It appears that a minimum of pressure of about 6 PSI is required in order to accurately test an impeller of a boat drive system. Thus, when the air bleed valve 116 is closed, the valve actuator 108 is adjusted to control the flow through the cylinder 102 in order to provide the desired initial pressure of about 8 to 12 PSI. A maximum desired pressure is about 14 PSI. When the initial pressure has been set, the indicator or pointer is then zeroed, as illustrated in FIG. 4, in order to test the impeller of the boat drive, as will be discussed in detail below.

If desired, the absolute pressure scale of the gauge 118, which shows only the pressure of the water, before the zeroing function, may be appropriately color coded. Accordingly, there would be a yellow line between 6 and 8 PSI on the scale, then a green line between 8 and 12 PSI, and another yellow line between 12 and 14 PSI. A red line would extend above 14 PSI to indicate that such pressure is too high for proper functioning of the tester apparatus.

FIG. 8 is a schematic diagram illustrating an alternate embodiment of the apparatus of the present invention. The embodiment of FIG. 8 includes a stern drive unit as outdrive and 20 which is connected to a water cooled engine 50. The drive unit 20 is illustrated in conjunction with an inboard engine.

The stern drive unit 20 includes a housing 22 with a water input opening 24 in the housing 22. A conduit 26 extends from the opening 24 to a housing or chamber 27 in which is disposed an impeller 28. From the chamber 27 in which the impeller 28 is disposed, a conduit 30 extends through the stern drive 20 and to a tee 32.

When the stern drive unit 20 is disposed in the water, the chamber 27 is below the water line so that the chamber automatically fills with water. The water line is indicated in FIG. 8 by a dashed line 21.

From the tee 32, a conduit 34 extends to a water pump 52 on the engine 50. The water pump 52 receives the flow of water from the impeller 28 and circulates the water as a coolant through the engine 50.

From the engine 50, a return water conduit 54 extends to the stern drive unit 20 and to a conduit 36 therein. The water from the conduits 54 and 36 is then discharged from the stern drive 20 adjacent to a propeller 38.

The mechanical elements which transmit the power from the engine 50 to the propeller 38 are not shown, since they are not part of the present invention. Rather, only the engine 50 and its components which relate rather directly to the present invention, along with the stern drive 20 and its elements, which are cooperatively involved in the present invention are illustrated.

From the tee 32, a conduit 60 extends to a gauge 62. The gauge 62 is responsive to the pressure of the water flowing in the conduit 30 from the impeller 28.

With the engine 50 operatively connected to the stern drive 20, and with the stern drive 20 disposed in water, the output of the impeller 28 to the water pump 52 is monitored by the gauge 62. The gauge 62 is a pressure gauge which has a direct reading, unlike the gauge 5 illustrated in FIGS. 1–5. Thus, the gauge 62 monitors the output of the impeller 28 to provide cooling water to the water pump 52 while the stern drive 20 is in the water, and while the stern drive 20 is propelling a craft powered by the engine 50.

Another alternate embodiment of the apparatus of the present invention is illustrated in FIGS. 9 and 10o FIG. 9 comprises a perspective view of the apparatus of FIGS. 1–5 in a use environment for monitoring the output of the impeller 28 when the stern drive 20 is out of the water. A hose 13, which may be a garden hose, or the like, appropriately connected to a source of water pressure, is connected to the attachment 3 of the cylinder 1. The opposite end of the cylinder 1, remote from the input attachment 3, is in turn connected to a testing clamp 70.

FIG. 10 comprises a view in partial section through the testing clamp 70 disposed over the opening 24 in the stern drive 22. For the following discussion, reference will primarily be made to FIGS. 9 and 10.

The tester 70 includes a pair of cups, including a cup 72 and a cup 82. The cups 72 and 82 are secured together by a clamp 92. The cup 72 includes a knob 74, and one portion of the clamp 92 is secured to the knob 74. The cup 72 is secured to the stern drive housing 22 opposite the opening 24.

The cup 82 includes a knob 84, and a bore 86 extends through the knob 84 and the cup 82 to communicate with the interior of the cup 82 and accordingly to communicate with the opening 24 when the tester 70 is in place. The clamp 92 is also secured to the knob 84 of the cup 82.

A conduit 86, with a fitting 90, is appropriately secured to the cup 82 at the bore 86.

A flow of water through the hose 13 flows through the cylinder 1, which is secured to the fitting 90, and through the conduit 86, the opening 24, the conduit 26, and to the impeller 28 in the chamber 27. The gauge 5 is adjusted as discussed above in conjunction with the explanation of FIGS. 1–5, to indicate the pressure of the flow of water through the hose 13. When the engine 50 is then started, if the impeller 28 is functioning properly, there will be a drop in the pressure, as indicated in FIG. 5. The drop in pressure indicates the functioning of the impeller 28.

FIG. 11 is a schematic circuit diagram of another alternate embodiment of the apparatus of the present invention, and related primarily to the embodiment of FIG. 8.

In the embodiment of FIG. 11, a light or lamp system embodiment 120 is illustrated. The light or clamp system embodiment 120 includes an input water conduit 122, which is comparable to the conduit 30 illustrated in FIG. 8. The conduit 122 extends to a pressure transducer 124, which replaces the tee 32 of FIG. 8. A conduit 126 extends from the pressure transducer 124 to a water pump such as the water pump 52 of FIG. 8.

The pressure transducer 124 is connected to a battery 130 by a conductor 132. The pressure transducer 124 is also connected to a lamp 136 by a conductor 134.

During the operation of the engine to which the apparatus 120 is connected, if the pressure sensed by the pressure transducer 124 drops below a predetermined minimum, current flows through the battery 130 through the conductors 132, the transducer 124, and the conductor 134 to illuminate the lamp 136. The illumination of the lamp 136 indicates that there is a drop in the water pressure. This in turn indicates that the impeller which provides a flow of water through the conduit 122 is not functioning properly.

FIG. 12 comprises a schematic circuit diagram of an alternate embodiment of the light system embodiment of FIG. 11. FIG. 10 accordingly comprises an enhanced electronic or lamp system 150 in which the output of a pressure transducer 152 is modified or varied in accordance with the speed of an engine, not shown, such as the engine 50.

In the embodiment of FIG. 12, the water input conduit 122 from the embodiment of FIG. 8 is illustrated as comprising the water input to the pressure transducer 152. The water conduit 126 then extends from the pressure transducer 152 to the water pump of the engine to which the apparatus 150 is connected, as discussed above.

The output of the pressure transducer 152 varies in response to the pressure of the water in conduit 122, and the water pressure in turn is responsive to the speed of the engine, such as the engine 50, to which the apparatus 150 is connected.

The speed of the engine is transmitted from an engine coil or ignition module 154 on a conductor 156 to an electronic control module 160. The electronic control module 160 includes microprocessor technology to respond to the speed of the engine, as indicated by input pulses on the connector 156 from the coil or module 154, and to predetermined parameters of pressure, depending on engine speed. Power for the control module 160 is provided by the conductor 132 from a battery, such as the battery 130 as shown in FIG. 11.

A conductor 162 extends from the control module 160 to the transducer 152. Input voltage to the transducer 152 flows to the transducer 152 on the conductor 162, and an output voltage from the transducer 152 is transmitted to the control module 160 on a conductor 164. The voltage on conductor 162 comprises control voltage for the transducer 152, and is battery voltage. The output voltage from the transducer 152 on conductor 164 comprises input voltage for the control module 160.

The electronic control module 160 interprets the input voltage on conductor 164 from the transducer 152 in terms of the rpm of the engine, as indicated by the input pulses or input signal on conductor 156. It is only when the two input signals on conductors 156 and 164 are "out of balance" that an output from the control module 160 on a connector 166 to the lamp 136 causes the lamp 136 to be illuminated. Thus, the illumination of the lamp 136 indicates an imbalance in the desired or appropriate pressure in the conduit 122 in relation to the rpm of the engine.

There has thus been outlined, rather broadly, the more important features of the instant invention in order that the detailed description may be better understood, and in order that the present contribution to the art may be better appreciated. There are, of course, additional features of the instant invention that will be described hereinafter and which will form the subject matter of the claims appended hereto. Those skilled in the art will appreciated that the conception, upon which this disclosure is based, may readily be utilized as a basis for the designing of other structures, methods and systems for carrying out the several purposes of the instant invention. It is important, therefore, that the claims be regarded as including such equivalent constructions insofar as they do not depart from the spirit and scope of the instant invention.

The gauges discussed above in conjunction with the various embodiments have been generally described simply as "gauges" without regard to their types. Reference has been made to absolute pressure, and, of course, reference has been made to the zeroing of the gauge and the illustration of vacuum pressure on one side of the zero and positive pressure on the other side of the scale. This is best shown in FIGS. 1–5. The pressure gauges accordingly have been direct reading pressure gauges, in which the pressure is a direct reading resulting from the flow of the water through the cylinders to which the gauges are attached. However, it may be desired to use a liquid filled gauge, which includes a diaphragm for actuating a pressure pointer. In such case, a movable bezzle will be fitted over the liquid filled gauge, with the movable bezzle simply showing a zero index which will be placed over the pointer after the initial pressure has been established. When the engine of the boat is started after the gauge has been zeroed, a pressure drop may be noted from the zero point.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Tester apparatus for an impeller of a marine engine comprising in combination:

a drive unit;

an impeller in the drive unit for providing a flow of water to a water pump;

a water pump for providing a flow of water to cool the engine;

a first conduit extending from the impeller to the water pump through which the water flows from the impeller to the water pump;

a second conduit connected to the first conduit; and a pressure gauge connected to the second conduit for indicating the pressure of the flow of water in the first conduit in response to the output of the impeller.

2. Tester apparatus for an impeller of a marine engine comprising in combination:

a drive unit;

an impeller in the drive unit for providing a flow of water to a water pump;

a water pump for providing a flow of water to cool the engine;

a first conduit extending from the impeller to the water pump through which water flows from the impeller to the water pump;

a transducer connected to the first conduit for providing an electrical output in response to the flow of water from the impeller in the first conduit;

a lamp connected to the transducer and illuminated in response to the electrical output of the transducer.

3. The apparatus of claim 2 which further includes a battery for providing electrical current to the transducer.

4. Marine engine apparatus comprising in combination:

a marine engine;

a water pump for providing a flow of water to cool the marine engine;

a drive unit connected to the marine engine;

an impeller on the drive unit for providing a flow of water to the water pump;

a conduit for the flow of water extending from the impeller to the water pump; and indicator means connected to the conduit to indicate to an operator of the marine engine the status of the flow of water from the impeller in terms of water pressure.

5. The apparatus of claim 4 in which the indicator means comprises a pressure gauge indicative of the pressure of the flow of water from the impeller.

6. The apparatus of claim 4 in which the indicator means comprises a transducer for providing an electrical output in response to a minimum predetermined pressure in the conduit and a lamp illuminated by the electrical output of the transducer.

7. The apparatus of claim 6 in which the indicator means includes:

means for providing a first signal responsive to the speed of the engine, means for providing a second signal responsive to the flow of water of the impeller, a control module for receiving the first and second signals and for providing an electrical output signal in response to the first and second signals, and signal means for providing a signal in response to the electrical output signal of the control module.

8. The apparatus of claim 7 in which the signal means comprises a lamp.

* * * * *